US011044603B2

(12) United States Patent
Kaede et al.

(10) Patent No.: US 11,044,603 B2
(45) Date of Patent: Jun. 22, 2021

(54) ON-VEHICLE DEVICE, GROUND DATA-MANAGING DEVICE, GROUND-TO-VEHICLE COMMUNICATION SECURITY SYSTEM, AND GROUND-TO-VEHICLE COMMUNICATION METHOD

(71) Applicant: MITSUBISHI ELECTRIC CORPORATION, Tokyo (JP)

(72) Inventors: Satoshi Kaede, Tokyo (JP); Norihiro Tsujimoto, Tokyo (JP); Tetsushi Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 227 days.

(21) Appl. No.: 16/095,471

(22) PCT Filed: Apr. 28, 2016

(86) PCT No.: PCT/JP2016/063481
§ 371 (c)(1),
(2) Date: Oct. 22, 2018

(87) PCT Pub. No.: WO2017/187632
PCT Pub. Date: Nov. 2, 2017

(65) Prior Publication Data
US 2019/0135312 A1    May 9, 2019

(51) Int. Cl.
*H04W 12/04* (2021.01)
*H04W 4/42* (2018.01)
(Continued)

(52) U.S. Cl.
CPC ............. *H04W 12/04* (2013.01); *B60L 15/40* (2013.01); *B61L 3/12* (2013.01); *B61L 15/0027* (2013.01);
(Continued)

(58) Field of Classification Search
CPC ......... H04W 12/04; H04W 4/42; H04W 4/40; H04W 12/0609; H04W 4/04; B61L 23/14;
(Continued)

(56) References Cited

U.S. PATENT DOCUMENTS 4,361,301 A * 11/1982 Rush ........................ B61L 1/18
                                                             104/298
5,377,270 A * 12/1994 Koopman, Jr. ........... H04L 9/12
                                                             340/5.26
(Continued)

FOREIGN PATENT DOCUMENTS

CN         104768151 A  *  7/2015
EP           2039583 B1      8/2011
(Continued)

OTHER PUBLICATIONS

International Search Report (with English translation) and Written Opinion issued in related International Patent Application No. PCT/JP2016/063481, 8 pages (dated Aug. 2, 2016).
(Continued)

*Primary Examiner* — J. Brant Murphy
(74) *Attorney, Agent, or Firm* — Buchanan Ingersoll & Rooney PC

(57) ABSTRACT

An on-vehicle device mounted on a train includes a second on-vehicle-side wireless communication unit that performs wireless communication with the ground side, and an on-vehicle-side ground-to-vehicle communication security unit that encrypts or decrypts wireless communication data. The on-vehicle-side ground-to-vehicle communication security unit includes an on-vehicle-side secret-key holding unit that retains a plurality of secret keys that have secret key numbers for performing encryption or decryption; an on-vehicle-side secret-key selecting unit that selects one secret key from the on-vehicle-side secret-key holding unit using a
(Continued)

secret key number calculated using train information unique to a train; and an on-vehicle-side encryption and decryption processing unit that performs encryption or decryption using the one secret key selected by the on-vehicle-side secret-key selecting unit.

4 Claims, 5 Drawing Sheets

(51) Int. Cl.
*H04L 9/14* (2006.01)
*B61L 23/14* (2006.01)
*B61L 3/12* (2006.01)
*B60L 15/40* (2006.01)
*H04W 12/069* (2021.01)
*H04W 4/40* (2018.01)
*B61L 15/00* (2006.01)
*B61L 27/00* (2006.01)

(52) U.S. Cl.
CPC .......... *B61L 23/14* (2013.01); *B61L 27/0005* (2013.01); *H04L 9/14* (2013.01); *H04W 4/40* (2018.02); *H04W 4/42* (2018.02); *H04W 12/069* (2021.01); *Y02T 90/16* (2013.01)

(58) Field of Classification Search
CPC .... B61L 3/12; B61L 15/0027; B61L 27/0005; B60L 15/40; H04L 9/14; Y02T 90/16
See application file for complete search history.

(56) References Cited

U.S. PATENT DOCUMENTS

| | | | |
|---|---|---|---|
| 5,708,712 A * | 1/1998 | Brinkmeyer | B60R 25/04 340/5.25 |
| 2004/0210757 A1* | 10/2004 | Kogan | B60R 25/00 713/182 |
| 2006/0002558 A1* | 1/2006 | Rekimoto | H04L 9/0844 380/270 |
| 2008/0295138 A1* | 11/2008 | Emoto | H04N 21/8153 725/81 |
| 2009/0279699 A1* | 11/2009 | Noda | H04L 63/06 380/259 |
| 2011/0118913 A1* | 5/2011 | Pretorius | B61L 23/047 701/19 |
| 2011/0235989 A1* | 9/2011 | Morimono | B61L 15/0036 386/230 |
| 2015/0033015 A1* | 1/2015 | Johnson | H04L 67/12 713/170 |
| 2017/0005799 A1* | 1/2017 | Morimoto | G06F 21/64 |
| 2019/0007215 A1* | 1/2019 | Hakuta | H04L 9/3247 |

FOREIGN PATENT DOCUMENTS

| | | |
|---|---|---|
| JP | 2009137555 A | 6/2009 |
| WO | 2015102054 A1 | 7/2015 |

OTHER PUBLICATIONS

Office Action dated Nov. 11, 2020, by the India Patent Office in corresponding India Patent Application No. 01847037537 and English translation of the Office Action. (7 pages).

* cited by examiner

ON-VEHICLE DEVICE, GROUND DATA-MANAGING DEVICE, GROUND-TO-VEHICLE COMMUNICATION SECURITY SYSTEM, AND GROUND-TO-VEHICLE COMMUNICATION METHOD

FIELD

The present invention relates to an on-vehicle device, a ground data-managing device, a ground-to-vehicle communication security system, and a ground-to-vehicle communication method for ensuring security of communication performed between the on-vehicle side and the ground side of a train.

BACKGROUND

In conventional wireless communication performed between an on-vehicle side and a ground side, the security of ground-to-vehicle communication is ensured by using closed network communication provided by a telecommunications carrier. Closed network communication is expensive compared with public wireless circuits and operation costs are high. Therefore, the use of public wireless circuits instead of closed networks is being considered. However, because public wireless circuits are shared by users who use the Internet, there is a threat to the security of communication data used in ground-to-vehicle communication. Therefore, when a public wireless circuit is used, data communication should be performed after encrypting the communication data using a method such as an Internet virtual private network (VPN). However, with an Internet VPN, when one specific secret key is continuously used, security against threats becomes less effective.

An example of a conventional technology in which a train control system that uses a different secret key for each train is disclosed in Patent Literature 1.

CITATION LIST

Patent Literature

Patent Literature 1: Japanese Patent Application Laid-Open No. 2009-137555

SUMMARY

Technical Problem

With to this conventional technology, although a different secret key is used for each train, the on-vehicle encryption processing and decryption processing is still however performed using one specific key distributed in advance. Therefore, when a public wireless circuit is used for ground-to-vehicle communication, there is a problem in that it is still difficult to ensure the necessary security.

The present invention has been devised in view of the above, and an object of the present invention is to obtain an on-vehicle device capable of ensuring high security even when a public wireless circuit is used.

Solution to Problem

In order to solve the problem and achieve the object, the present invention relates to an on-vehicle device mounted on a train that includes an on-vehicle-side wireless communication unit to perform wireless communication with a ground side; and an on-vehicle-side ground-to-vehicle communication security unit to encrypt or decrypt data of the wireless communication. The on-vehicle-side ground-to-vehicle communication security unit includes an on-vehicle-side secret-key holding unit to retain a plurality of secret keys that have secret key numbers, the secret keys being for performing encryption or decryption of the data of the wireless communication; an on-vehicle-side secret-key selecting unit to select one secret key from the on-vehicle-side secret-key holding unit using a secret key number calculated using train information unique to the train; and an on-vehicle-side encryption and decryption processing unit to perform encryption or decryption of the data of the wireless communication using the one secret key selected by the on-vehicle-side secret-key selecting unit.

Advantageous Effects of Invention

According to the present invention, there is an effect whereby it is possible to obtain an on-vehicle device capable of ensuring high security even with a public wireless circuit.

DESCRIPTION OF EMBODIMENTS

An on-vehicle device, a ground data-managing device, a ground-to-vehicle communication security system, and a ground-to-vehicle communication method according to an embodiment of the present invention are explained in detail below with reference to the drawings. Note that the present invention is not limited to the embodiment.

Embodiment

Figure 1:
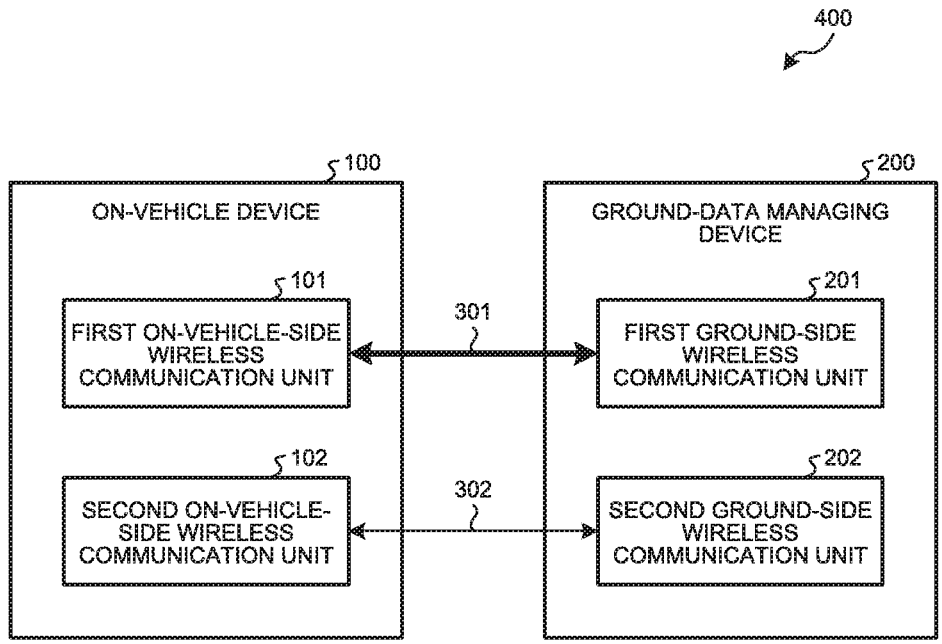
FIG. 1 is a diagram illustrating an example configuration of a ground-to-vehicle communication security system according to an embodiment.

FIG. 1 is a diagram illustrating an example configuration of a ground-to-vehicle communication security system according to an embodiment of the present invention. A ground-to-vehicle communication security system 400 illustrated in FIG. 1 includes an on-vehicle device 100 mounted on a train and a ground data-managing device 200 located on the ground side.

A first on-vehicle-side wireless communication unit 101 included in the on-vehicle device 100 performs, via a first communication line 301, wireless communication with a first ground-side wireless communication unit 201 included in the ground data-managing device 200. A second on-vehicle-side wireless communication unit 102 included in the on-vehicle device 100 performs, via a second communication line 302, wireless communication with a second ground-side wireless communication unit 202 included in the ground data-managing device 200.

The first communication line 301 is a public wireless circuit for performing large-capacity data communication. The first communication line 301 transmits and receives all the out-going and in-coming data between the ground and a vehicle transmitted and received by the second communication line 302. The communication speed of the first communication line 301 is adequate if it is, for example, 1 Mbps or higher. However, the communication speed is not limited to this. Note that, because the first communication line 301 is a public wireless circuit, encryption of data is performed during communication.

The second communication line 302 is a small-capacity closed network circuit for performing minimum data communication. An example of the communication speed of the second communication line 302 is 9.6 kbps. However, the communication speed is not limited to this. Note that, because the second communication line 302 is a closed network circuit, encryption of data is not performed during communication.

Figure 2:
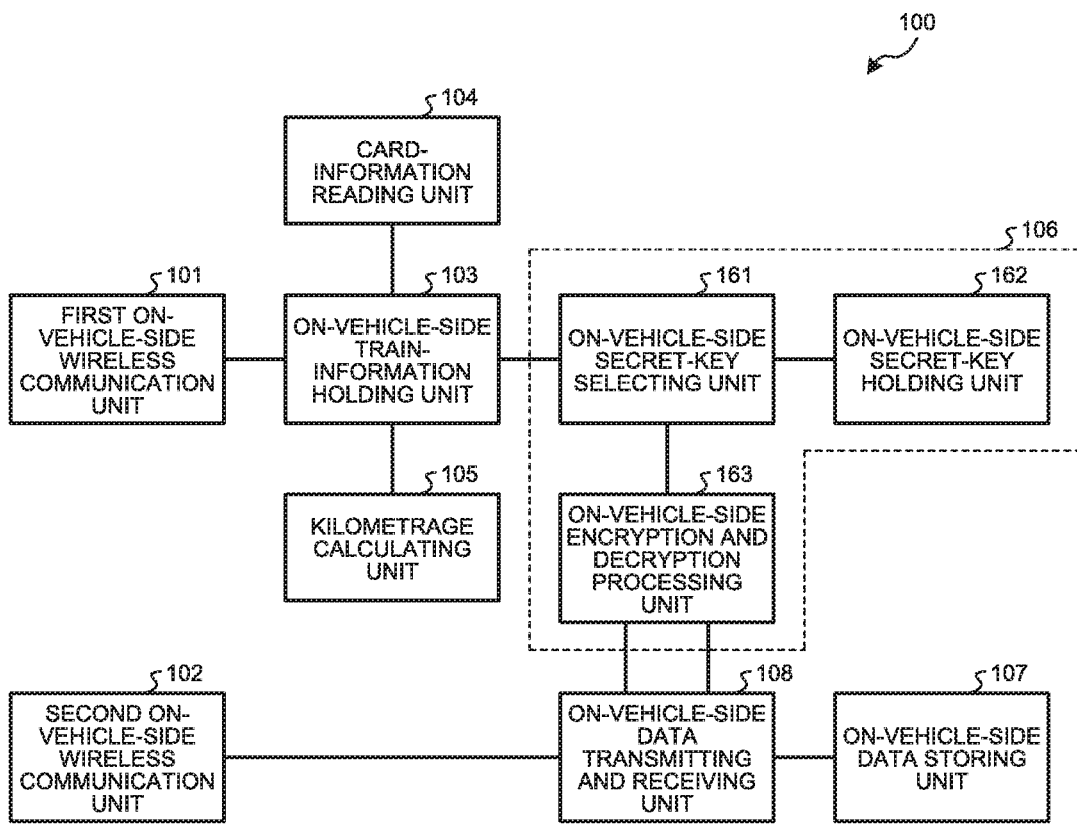
FIG. 2 is a diagram illustrating an example configuration of the on-vehicle device illustrated in FIG. 1.

FIG. 2 is a diagram illustrating an example configuration of the on-vehicle device 100 illustrated in FIG. 1. The on-vehicle device 100 illustrated in FIG. 2 includes a first on-vehicle-side wireless communication unit 101, a second on-vehicle-side wireless communication unit 102, an on-vehicle-side train-information holding unit 103, a card-information reading unit 104, a kilometrage calculating unit 105, an on-vehicle-side ground-to-vehicle communication security unit 106, an on-vehicle-side data storing unit 107, and an on-vehicle-side data transmitting and receiving unit 108.

The on-vehicle-side train-information holding unit 103 retains train information, train operation information, and train traveling state information and sets the kilometrage calculating unit 105 using the position information on a starting station.

Note that the train information includes information unique to a train, such as present kilometrage and the train number of the train. The train operation information is information including a scheduled traveling route; a traveling location; a forward station; a backward station; the next station arrival platform number; and time information on the train. The train traveling state information includes the train information.

The card-information reading unit 104 is provided in the motorman's cab of the train on which the on-vehicle device 100 is mounted. The card-information reading unit 104 reads train operation information including a scheduled traveling route from a card set by the motorman and stores the train operation information in the on-vehicle-side train-information holding unit 103.

The kilometrage calculating unit 105 counts a pulse signal received from a tacho-generator (not illustrated) mounted on the train. The kilometrage calculating unit 105 then uses, as a starting point, the position information on the first station to which the on-vehicle-side train-information retaining unit 103 has been set to calculate the present kilometrage of the train and stores the result of the calculation in the starting point on-vehicle-side train-information retaining unit 103.

The on-vehicle-side data storing unit 107 collects and stores vehicle state information, which is state information on a plurality of devices included in the train. The on-vehicle-side data transmitting and receiving unit 108 acquires data from the second on-vehicle-side wireless communication unit 102 and requests the on-vehicle-side ground-to-vehicle communication security unit 106 to decrypt the data. Alternatively, the on-vehicle-side data transmitting and receiving unit 108 acquires data from the on-vehicle-side data storing unit 107 and requests the on-vehicle-side ground-to-vehicle communication security unit 106 to encrypt the data. Note that the vehicle state data is data including train information, train operation information, and train traveling state information and is data also including the train length and ID information on devices mounted on the vehicle that do not change during traveling.

The on-vehicle-side ground-to-vehicle communication security unit 106 includes an on-vehicle-side secret-key selecting unit 161, an on-vehicle-side secret-key holding unit 162, and an on-vehicle-side encryption and decryption processing unit 163. The on-vehicle-side ground-to-vehicle communication security unit 106 performs encryption or decryption of data in response to a request from the on-vehicle-side data transmitting and receiving unit 108. The on-vehicle-side secret-key selecting unit 161 acquires train information unique to the train, such as present kilometrage and the train number, from the on-vehicle-side train-information holding unit 103 and selects and acquires one secret key corresponding to the train information from the on-vehicle-side secret-key holding unit 162. The on-vehicle-side secret-key holding unit 162 retains a plurality of secret keys used for encryption and decryption of data. The on-vehicle-side encryption and decryption processing unit 163 performs encryption or decryption of the data using the secret key selected by the on-vehicle-side secret-key selecting unit 161 in response to a request from the on-vehicle-side data transmitting and receiving unit 108. Note that a secret key number is allocated to each respective secret key, and if a secret key number is determined, then this determines the selection of one secret key. The on-vehicle-side secret-key selecting unit 161 holds a table on which a value calculated from the train information and the secret key number is associated.

Figure 3:
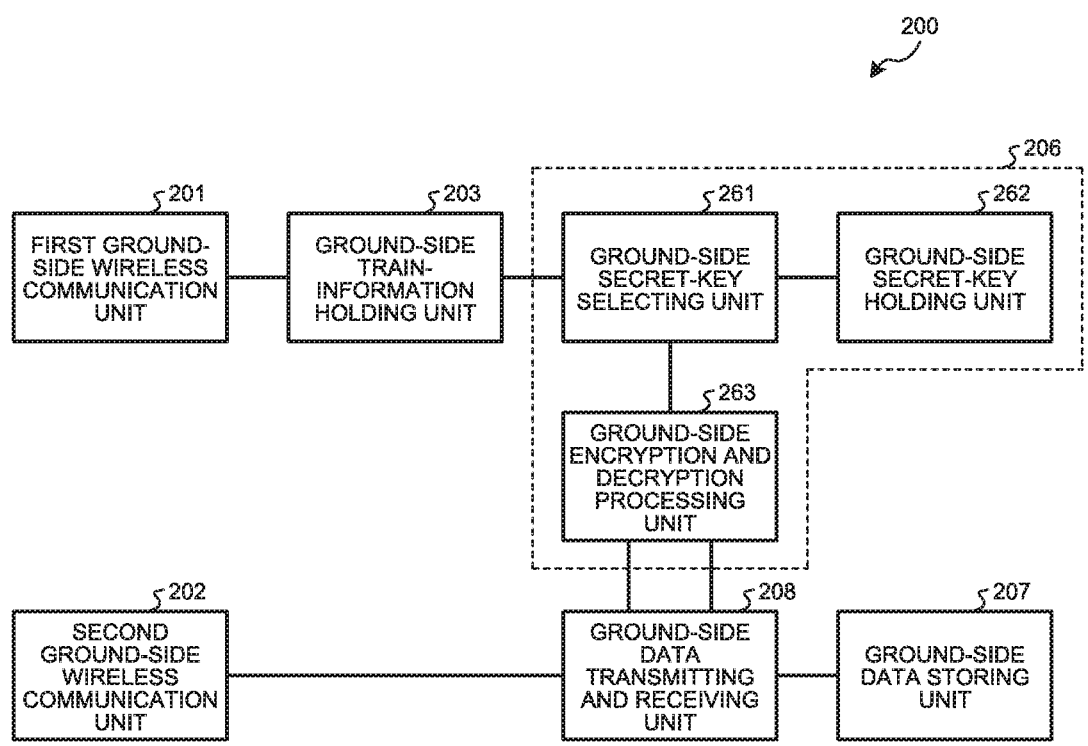
FIG. 3 is a diagram illustrating an example configuration of the ground data-managing device illustrated in FIG. 1.

FIG. 3 is a diagram illustrating an example configuration of the ground data-managing device 200 illustrated in FIG. 1. The ground data-managing device 200 illustrated in FIG. 3 includes a first ground-side wireless communication unit 201, a second ground-side wireless communication unit 202, a ground-side train-information holding unit 203, a ground-side ground-to-vehicle communication security unit 206, a ground-side data storing unit 207, and a ground-side data transmitting and receiving unit 208.

The ground-side train-information holding unit 203 retains train information, train operation information, and train traveling state information.

The ground-side data storing unit 207 stores vehicle state data of trains. The ground-side data transmitting and receiving unit 208 acquires data from the second ground-side wireless communication unit 202 and requests the ground-side ground-to-vehicle communication security unit 206 to decrypt the data. Alternatively, the ground-side data transmitting and receiving unit 208 acquires data from the ground-side data storing unit 207 and requests the ground-side ground-to-vehicle communication security unit 206 to encrypt the data.

The ground-side ground-to-vehicle communication security unit 206 includes a ground-side secret-key selecting unit 261, a ground-side secret-key holding unit 262, and a ground-side encryption and decryption processing unit 263.

The ground-side ground-to-vehicle communication security unit 206 performs encryption and decryption of data according to a request from the ground-side data transmitting and receiving unit 208. The ground-side secret-key selecting unit 261 acquires train information unique to a train from the ground-side train-information holding unit 203 and selects and acquires one secret key corresponding to the train information from the ground-side secret-key holding unit 262. The ground-side secret-key holding unit 262 retains a plurality of secret keys used for encryption or decryption of data. The ground-side encryption and decryption processing unit 263 encrypts or decrypts the data using the secret key selected by the ground-side secret-key selecting unit 261 in response to a request from the ground-side data transmitting and receiving unit 208.

Figure 4:
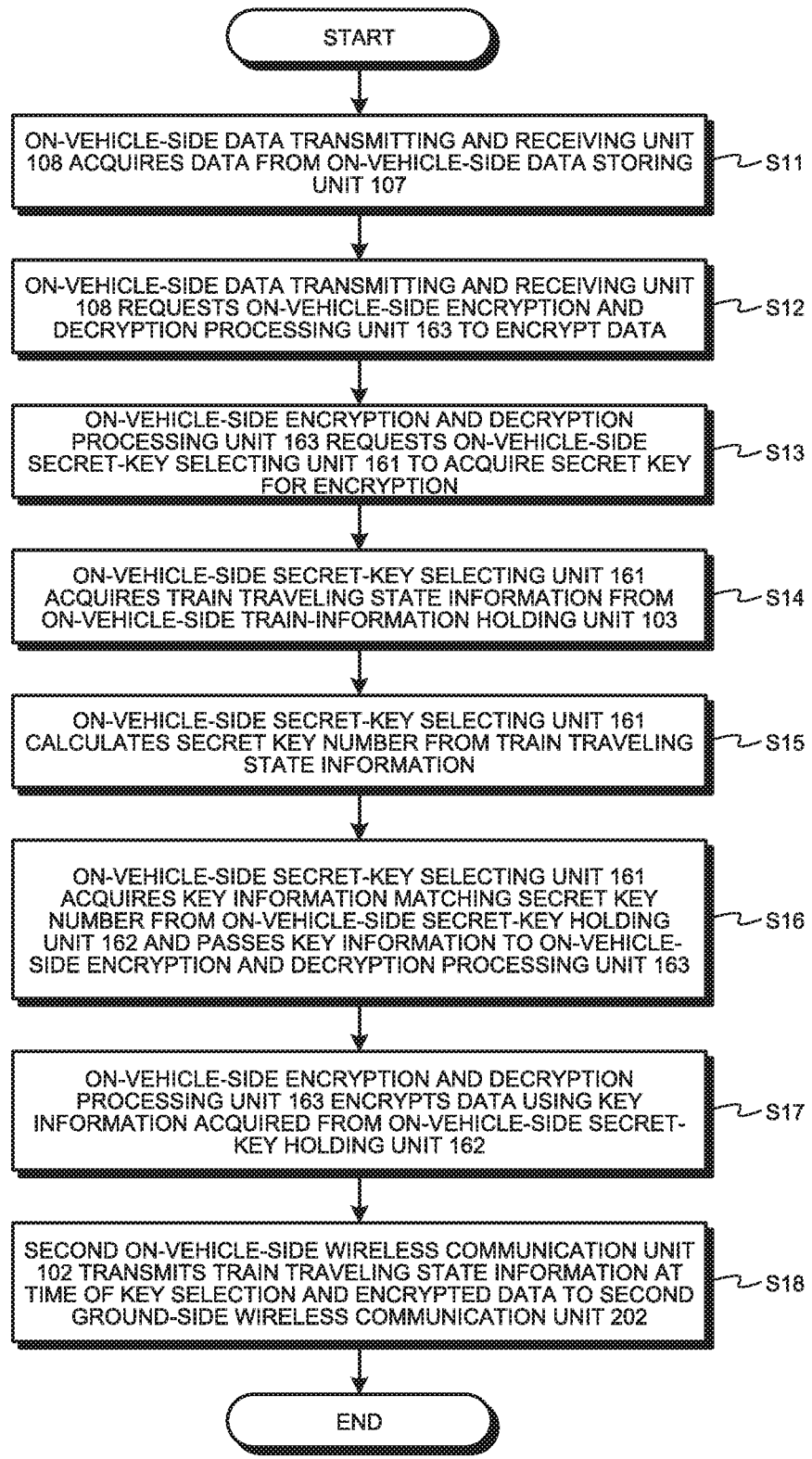
FIG. 4 is a flowchart illustrating an operation example at the time when the on-vehicle device transmits encrypted data to the ground data-managing device over the ground-to-vehicle communication security system illustrated in FIG. 1.

FIG. 4 is a flowchart illustrating an operation example at the time when the on-vehicle device 100 transmits encrypted data to the ground data-managing device 200 in the ground-to-vehicle communication security system 400 illustrated in FIG. 1. When a vehicle power supply (not illustrated) in the train is turned on, processing is started. First, the on-vehicle-side data transmitting and receiving unit 108 acquires vehicle state data from the on-vehicle-side data storing unit 107 (S11).

Next, the on-vehicle-side data transmitting and receiving unit 108 requests the on-vehicle-side encryption and decryption processing unit 163 to encrypt the vehicle state data (S12).

The on-vehicle-side encryption and decryption processing unit 163, requested to encrypt the vehicle state data, requests the on-vehicle-side secret-key selecting unit 161 to acquire a secret key for encryption (S13). Note that the secret key for encryption is also called an encryption key.

The on-vehicle-side secret-key selecting unit 161, requested to acquire the secret key for encryption, acquires train traveling state information from the on-vehicle-side train-information holding unit 103 (S14).

The on-vehicle-side secret-key selecting unit 161, which has acquired the train traveling state information, calculates a secret key number from the train traveling state information (S15). Train information unique to a target train is used for the calculation of the secret key number. A method of calculating a secret key number is explained below.

The on-vehicle-side secret-key selecting unit 161, which has calculated the secret key number, acquires key information matching the calculated secret key number from the on-vehicle-side secret-key holding unit 162 and passes the key information to the on-vehicle-side encryption and decryption processing unit 163 (S16).

The on-vehicle-side encryption and decryption processing unit 163 encrypts the vehicle state data using the key information acquired from the on-vehicle-side secret-key holding unit 162 (S17).

Next, the second on-vehicle-side wireless communication unit 102 transmits the train traveling state information at the time of the key selection and the encrypted data to the second ground-side wireless communication unit 202 (S18) and ends the processing. Note that the time of the key selection is the time of the encryption request.

Figure 5:
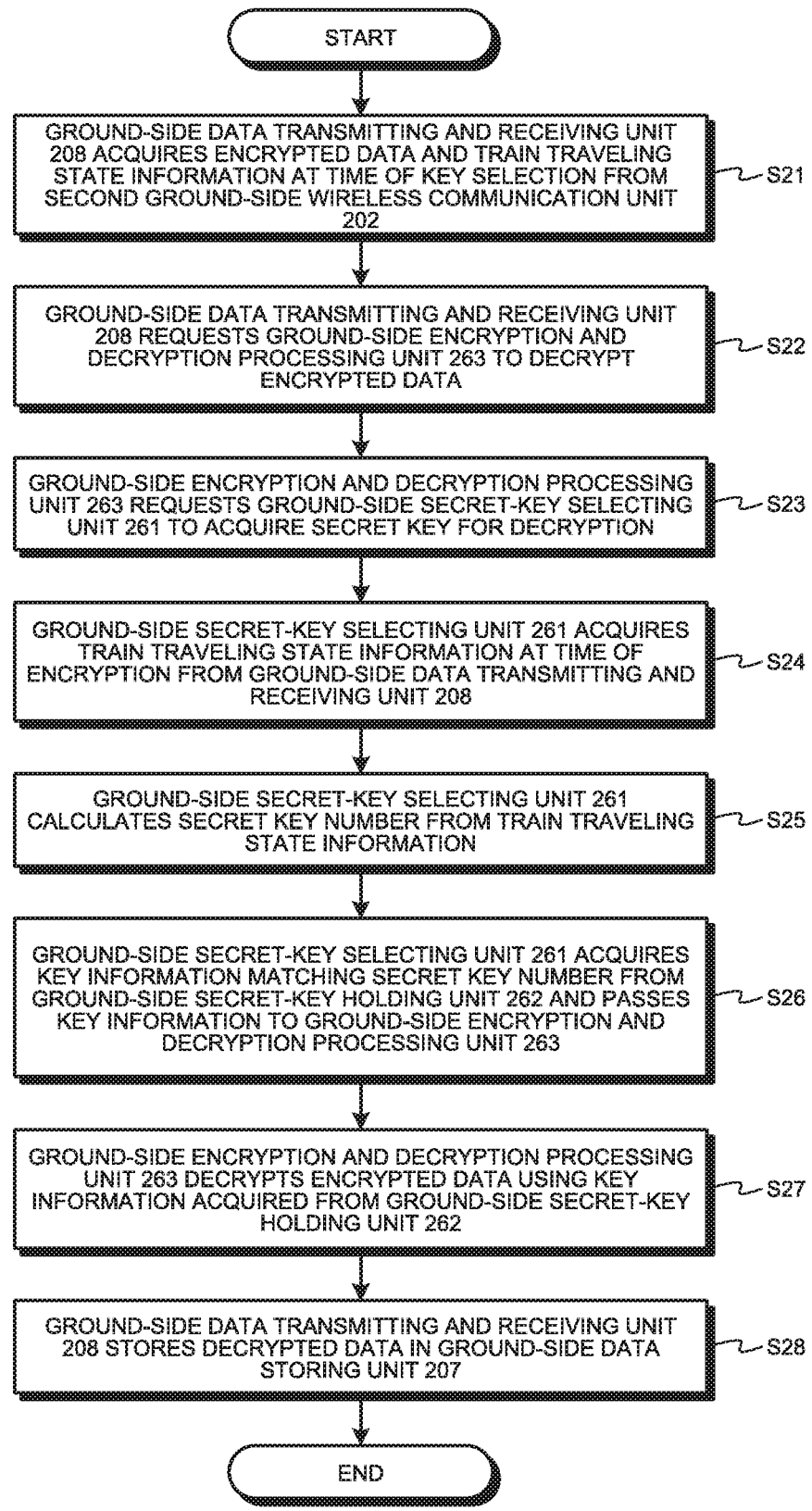
FIG. 5 is a flowchart illustrating an operation example at the time when the ground data-managing device decrypts encrypted data received over the ground-to-vehicle communication security system illustrated in FIG. 1.

FIG. 5 is a flowchart illustrating an operation example at the time when the ground data-managing device 200 decrypts received encrypted data in the ground-to-vehicle communication security system 400 illustrated in FIG. 1. When the vehicle power supply (not-illustrated) of the train is turned on, processing is started. First, the ground-side data transmitting and receiving unit 208 acquires encrypted data and the train traveling state information at the time of the key selection from the second ground-side wireless communication unit 202 (S21).

The ground-side data transmitting and receiving unit 208, which has acquired the encrypted data, requests the ground-side encryption and decryption processing unit 263 to decrypt the encrypted data (S22).

The ground-side encryption and decryption processing unit 263, requested to decrypt the encrypted data, requests the ground-side secret-key selecting unit 261 to acquire a secret key for decryption (S23). Note that the secret key for decryption is called a decryption key as well.

The ground-side secret-key selecting unit 261 that was requested to acquire the secret key for decryption acquires the train traveling state information at the time of the encryption from the ground-side data transmitting and receiving unit 208 (S24).

The ground-side secret-key selecting unit 261, which acquired the train traveling state information at the time of the encryption, calculates a secret key number from the acquired train traveling state information (S25). The method of calculating a secret key number is the same as S15 and is explained below.

The ground-side secret-key selecting unit 261, which has calculated the secret key number, acquires key information matching the secret key number from the ground-side secret-key holding unit 262 and passes the key information to the ground-side encryption and decryption processing unit 263 (S26).

The ground-side encryption and decryption processing unit 263 decrypts the encrypted data using the acquired key information acquired from the ground-side secret-key holding unit 262 (S27).

Next, the ground-side data transmitting and receiving unit 208 stores the decrypted data in the ground-side data storing unit 207 (S28) and ends the processing.

By selecting the secret key using the train information unique to the target train as illustrated in FIGS. 4 and 5, it is possible to ensure high security even over a public wireless line. Note that, in FIGS. 4 and 5, the on-vehicle device 100 encrypts the data and the ground data-managing device 200 decrypts the data. However, there is a similar case in which the ground data-managing device 200 encrypts the data and the on-vehicle device 100 decrypts the data.

Methods of calculating a secret key number are illustrated here. A first method that can be exemplified is a method of dividing present kilometrage during traveling by the number of secret key candidates, calculating a remainder n1 of the division, and selecting a secret key having a secret key number n1. A second method that can be exemplified is a method of dividing a train number by the number of secret key candidates, calculating a remainder n2 of the division, and selecting a secret key having a secret key number n2. A third method that can be exemplified is a method of dividing a total value of a train number and a formation number by the number of secret key candidates, calculating a remainder n3 of the division, and selecting a secret key having a secret key number n3. A fourth method that can be exemplified is a method of dividing, by the number of secret key candidates, a code represented by a hexadecimal number of a backward station, which is the station immediately preceding the station to which the train is currently traveling, calculating a remainder n4 of the division, and selecting a secret key having a secret key number n4. A fifth method that can be exemplified is a method of dividing, by the number of secret key candidates, a numerical value obtained by adding an arrival station platform number to a code represented by a hexadecimal number of a forward station, which is the station immediately following the station to which the train is currently traveling, calculating a remainder n5 of the division, and selecting a secret key having a secret key number n5. Alternatively, a secret key number can be calculated in the same manner as described above using the sum of the indoor temperatures of all the cars or the sum of vehicle occupancies of all the cars as a parameter.

Figure 6:
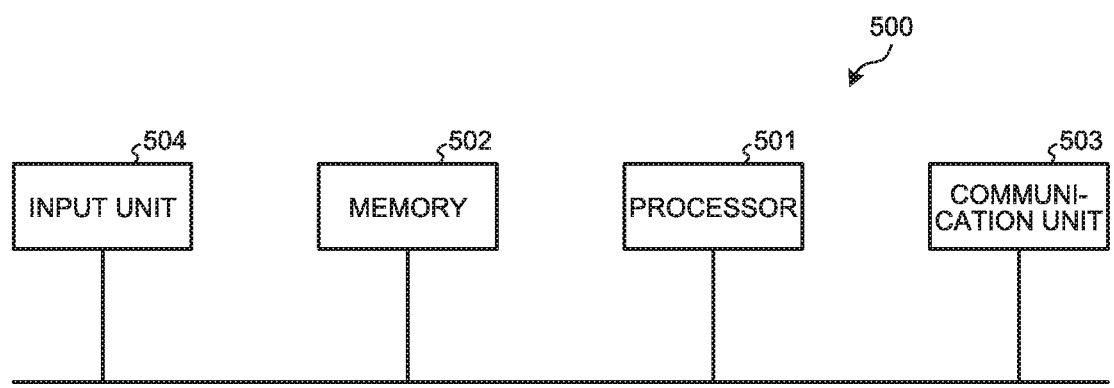
FIG. 6 is a diagram illustrating a general example configuration of hardware for implementing the on-vehicle device illustrated in FIG. 2 and the ground data-managing device illustrated in FIG. 3.

FIG. 6 is a diagram illustrating a general example configuration of the hardware for implementing the on-vehicle device 100 illustrated in FIG. 2 and the ground data-managing device 200 illustrated in FIG. 3. Hardware 500 illustrated in FIG. 6 includes a processor 501, a memory 502, a communication unit 503, and an input unit 504. The processor 501 performs an arithmetic operation and control by software using data received from the memory 502 or the communication unit 503. The memory 502 stores data and software necessary for when the processor 501 performs the arithmetic operation and the control. The communication unit 503 performs transmission and reception of data to and from external hardware via wireless communication. The input unit 504 performs input of data to the hardware 500.

The first on-vehicle-side wireless communication unit 101, the second on-vehicle-side wireless communication unit 102, the first ground-side wireless communication unit 201, the second ground-side wireless communication unit 202, the on-vehicle-side data transmitting and receiving unit 108, and the ground-side data transmitting and receiving unit 208 are implemented as the communication unit 503.

The on-vehicle-side train-information holding unit 103, the on-vehicle-side data storing unit 107, the on-vehicle-side secret-key holding unit 162, the ground-side train-information holding unit 203, the ground-side data storing unit 207, and the ground-side secret-key holding unit 262 are implemented as the memory 502.

The kilometrage calculating unit 105, the on-vehicle-side secret-key selecting unit 161, the on-vehicle-side encryption and decryption processing unit 163, the ground-side secret-key selecting unit 261, and the ground-side encryption and decryption processing unit 263 are implemented as the processor 501 and the memory 502.

The card-information reading unit 104 is implemented as the input unit 504. Note that the processor 501, the memory 502, and the communication unit 503 can be provided as a plurality of the processors 501, a plurality of the memories 502, and a plurality of the communication units 503, respectively.

According to this embodiment, it is possible to ensure high security even when a public wireless circuit is used. Therefore, it is possible to perform minimum data communication using the first communication line 301, which is a closed network and to perform other data communication using the second communication line 302, which is a public wireless circuit. It is possible to greatly reduce the amount of data communication over the closed network. Therefore, it is possible to greatly reduce operation costs.

Note that the present invention includes not only the on-vehicle device 100, the ground data-managing device 200, and the ground-to-vehicle communication security system 400 but also a ground-to-vehicle communication method in which the on-vehicle device 100 mounted on the train and the ground data-managing device 200 located on the ground side perform wireless communication. The ground-to-vehicle communication method of the present invention includes a step of selecting, during wireless communication, one secret key using a secret key number calculated using train information unique to the train and a step of performing encryption or decryption of wireless communication data using the selected secret key.

Note that, in the present invention, the configuration of the on-vehicle device is not limited to the configuration illustrated in FIG. 2, and a traveling-schedule recording unit can be provided instead of the card-information reading unit 104.

The configuration explained above in the embodiment indicates an example of the present invention. The configuration can be combined with other publicly-known technologies and a part of the configuration can be omitted or changed to an extent not departing from the spirit of the present invention.

REFERENCE SIGNS LIST 100 on-vehicle device; 101 first on-vehicle-side wireless communication unit; 102 second on-vehicle-side wireless communication unit; 103 on-vehicle-side train-information holding unit; 104 card-information reading unit; 105 kilometrage calculating unit; 106 on-vehicle-side ground-to-vehicle communication security unit; 107 on-vehicle-side data storing unit; 108 on-vehicle-side data transmitting and receiving unit; 161 on-vehicle-side secret-key selecting unit; 162 on-vehicle-side secret-key holding unit; 163 on-vehicle-side encryption and decryption processing unit; 200 ground data-managing device; 201 first ground-side wireless communication unit; 202 second ground-side wireless communication unit; 203 ground-side train-information holding unit; 206 ground-side ground-to-vehicle communication security unit; 207 ground-side data storing unit; 208 ground-side data transmitting and receiving unit; 261 ground-side secret-key selecting unit; 262 ground-side secret-key holding unit; 263 ground-side encryption and decryption processing unit; 301 first communication line; 302 second communication line; 400 ground-to-vehicle communication security system; 500 hardware; 501 processor; 502 memory; 503 communication unit; 504 input unit.

The invention claimed is:

1. A ground-to-vehicle communication method in which an on-vehicle device mounted on a train and a ground data-managing device provided on a ground side perform wireless communication, the on-vehicle device including a memory to retain a plurality of secret keys that have secret key numbers, the secret keys for performing encryption or decryption of data of the wireless communication, the ground-to-vehicle communication method comprising:
   a step of selecting, during the wireless communication, one secret key from the memory using a secret key number calculated using train information unique to the train; and
   a step of performing encryption or decryption of data of the wireless communication using the selected secret key.

2. An on-vehicle device mounted on a train, comprising:
   a memory to retain a plurality of secret keys that have secret key numbers, the plurality of secret keys for performing encryption or decryption of data of wireless communication with a ground side; and
   a processor to select one secret key from the memory using a secret key number calculated using train information unique to the train and perform encryption or decryption of the data of the wireless communication using the selected one secret key.

3. A ground-to-vehicle communication security system comprising:

an on-vehicle device mounted on a train, comprising:
> a memory to retain a plurality of secret keys that have secret key numbers, the plurality of secret keys for performing encryption or decryption of data of wireless communication with a ground side; and
> a processor to select one secret key from the memory using a secret key number calculated using train information unique to the train and perform encryption or decryption of the data of the wireless communication using the selected one secret key; and a ground data-managing device comprising:

a memory to retain the plurality of secret keys that have secret key numbers, the secret keys for performing encryption or decryption of the data of the wireless communication; and a processor to select the one secret key from the memory of the ground data-managing device using the secret key number calculated using the train information unique to the train and perform encryption or decryption of the data of the wireless communication using the selected one secret key.

4. A ground data-managing device that performs wireless communication with an on-vehicle device mounted on a train, the ground data-managing device comprising:
> a memory to retain a plurality of secret keys that have secret key numbers, the plurality of secret keys for performing encryption or decryption of data of wireless communication with the on-vehicle device; and
> a processor to select one secret key from the memory using a secret key number calculated using train information unique to the train and perform encryption or decryption of the data of the wireless communication using the selected one secret key.

* * * * *